(12) United States Patent
Kravitz et al.

(10) Patent No.: US 9,832,026 B2
(45) Date of Patent: *Nov. 28, 2017

(54) SYSTEM AND METHOD FROM INTERNET OF THINGS (IOT) SECURITY AND MANAGEMENT

(71) Applicant: T-Central, Inc., Dover, DE (US)

(72) Inventors: David W. Kravitz, San Jose, CA (US); Donald Houston Graham, III, Pasadena, CA (US); Josselyn L. Boudett, Clearwater, FL (US); Russell S. Dietz, San Ramon, CA (US)

(73) Assignee: T-CENTRAL, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,982

(22) Filed: Jun. 13, 2017

(65) Prior Publication Data

US 2017/0279620 A1    Sep. 28, 2017

Related U.S. Application Data

(63) Continuation of application No. 15/469,244, filed on Mar. 24, 2017, now Pat. No. 9,716,595, and a
(Continued)

(51) Int. Cl.
*G06F 21/33* (2013.01)
*H04L 9/32* (2006.01)
(Continued)

(52) U.S. Cl.
CPC .......... *H04L 9/3268* (2013.01); *H04L 9/0819* (2013.01); *H04L 63/0876* (2013.01); *H04L 63/10* (2013.01); *H04L 2209/84* (2013.01)

(58) Field of Classification Search
CPC ................................. H04L 9/32; H04L 63/08
See application file for complete search history.

(56) References Cited

U.S. PATENT DOCUMENTS 8,656,484 B2   2/2014   Barton et al.
9,094,407 B1   7/2015   Matthieu et al.
(Continued)

FOREIGN PATENT DOCUMENTS

CN   105791272 A   *   7/2016

OTHER PUBLICATIONS

International Search Report ,Transmittal, and Recordation of Search History (12 pages) and Written Opinion (6 pages) for related International Patent Application No. PCT/US17/24112 filed Mar. 24, 2017.

*Primary Examiner* — Izunna Okeke
(74) *Attorney, Agent, or Firm* — Lewis Roca Rothgerber Christie LLP

(57) ABSTRACT

System and method for establishing a secure communication between a plurality of Internet of Things (IoT) devices, includes provisioning a first and a second IoT devices by providing a unique identification, a digital identity token and a cryptographic key to each of the first and second IoT devices; authenticating the second IoT device by the first IoT device; inviting the second IoT device by the first IoT device to establish a communication line with the first IoT device; establishing a secure communication line between the first IoT device and the second IoT device by authenticating the communication line between the first IoT device and the second IoT device and issuing a digital certificate to the communication line between the first IoT device and the second IoT device; establishing secure communication lines between the first IoT device, the second IoT device and a plurality of more devices; and grouping the first IoT device, the second IoT device and the plurality of more devices into different groups based on a predetermined criteria.

19 Claims, 9 Drawing Sheets

Related U.S. Application Data continuation-in-part of application No. 15/269,832, filed on Sep. 19, 2016, which is a continuation of application No. 15/002,225, filed on Jan. 20, 2016, now Pat. No. 9,455,978, which is a continuation of application No. 14/218,897, filed on Mar. 18, 2014, now Pat. No. 9,270,663, said application No. 15/002,225 is a continuation-in-part of application No. 13/481,553, filed on May 25, 2012, now abandoned, said application No. 15/002,225 is a continuation-in-part of application No. 13/096,764, filed on Apr. 28, 2011, now abandoned, said application No. 15/469,244 is a continuation-in-part of application No. 15/409,427, filed on Jan. 18, 2017, which is a continuation of application No. 15/154,861, filed on May 13, 2016, now Pat. No. 9,578,035, which is a continuation of application No. 14/715,588, filed on May 18, 2015, now Pat. No. 9,356,916, and a continuation-in-part of application No. 14/218,897, filed on Mar. 18, 2014, now Pat. No. 9,270,663, said application No. 15/154,861 is a continuation-in-part of application No. 13/481,553, filed on May 25, 2012, now abandoned, said application No. 15/154,861 is a continuation-in-part of application No. 13/096,764, filed on Apr. 28, 2011, now abandoned.

(60) Provisional application No. 62/313,124, filed on Mar. 25, 2016, provisional application No. 62/326,812, filed on Apr. 24, 2016, provisional application No. 62/330,839, filed on May 2, 2016, provisional application No. 62/347,822, filed on Jun. 9, 2016, provisional application No. 62/369,722, filed on Aug. 1, 2016, provisional application No. 62/373,769, filed on Aug. 11, 2016, provisional application No. 62/401,150, filed on Sep. 28, 2016, provisional application No. 61/792,927, filed on Mar. 15, 2013, provisional application No. 61/650,866, filed on May 23, 2012, provisional application No. 61/490,952, filed on May 27, 2011, provisional application No. 61/416,629, filed on Nov. 23, 2010, provisional application No. 61/367,576, filed on Jul. 26, 2010, provisional application No. 61/367,574, filed on Jul. 26, 2010, provisional application No. 61/330,226, filed on Apr. 30, 2010, provisional application No. 62/133,371, filed on Mar. 15, 2015, provisional application No. 61/994,885, filed on May 17, 2014.

(51) Int. Cl.
*H04L 9/08* (2006.01)
*H04L 29/06* (2006.01)

(56) References Cited

U.S. PATENT DOCUMENTS

| | | |
|---|---|---|
| 2007/0050618 A1 | 3/2007 | Roux et al. |
| 2015/0334554 A1 | 11/2015 | Song et al. |

* cited by examiner

SYSTEM AND METHOD FROM INTERNET OF THINGS (IOT) SECURITY AND MANAGEMENT

CROSS-REFERENCE TO RELATED APPLICATIONS

This Patent Application is a continuation of U.S. patent application Ser. No. 15/469,244 filed Mar. 24, 2017, which claims the benefit of U.S. Provisional Patent Application Nos. 62/401,150, filed Sep. 28, 2016; 62/373,769, filed Aug. 11, 2016; 62/369,722, filed Aug. 1, 2016; 62/347,822, filed Jun. 9, 2016; 62/330,839, filed May 2, 2016; 62/326,812, filed Apr. 24, 2016; and 62/313,124, filed Mar. 25, 2016 the entire contents of all of which are hereby expressly incorporated by reference.

This application is also a continuation of U.S. patent application Ser. No. 15/469,244, filed Mar. 24, 2017; Ser. No. 15/269,832, filed Sep. 19, 2016, which is a continuation of U.S. patent application Ser. No. 15/002,225, filed Jan. 20, 2016, now issued as U.S. Pat. No. 9,455,978, which is a continuation of U.S. patent application Ser. No. 14/218,897, filed Mar. 18, 2014, now issued as U.S. Pat. No. 9,270,663, which claims priority to U.S. Provisional Patent Application No. 61/792,927, filed Mar. 15, 2013.

This application is also continuation-in-part of U.S. patent application Ser. No. 15/409,427, filed Jan. 18, 2017, which is a Continuation of U.S. patent application Ser. No. 15/154,861, filed May 13, 2016, now issued as U.S. Pat. No. 9,578,035, which is a continuation of U.S. patent application Ser. No. 14/715,588, filed May 18, 2015, now issued as U.S. Pat. No. 9,356,916, which claims priority from U.S. Provisional Patent Application Nos. 61/994,885, filed May 17, 2014 and 62/133,371, filed Mar. 15, 2015. U.S. patent application Ser. No. 15/154,861, filed May 13, 2016, now issued as U.S. Pat. No. 9,578,035 is also a continuation-in-part of U.S. patent application Ser. No. 14/218,897, filed Mar. 18, 2014, now issued as U.S. Pat. No. 9,270,663, which claims priority to U.S. Provisional Patent Application No. 61/792,927, filed Mar. 15, 2013.

U.S. patent application Ser. No. 15/002,225 filed Jan. 20, 2016 and Ser. No. 15/154,861 filed May 13, 2016 are both continuations-in-part of U.S. patent application Ser. No. 13/481,553 filed May 25, 2012, which claims priority of U.S. Provisional Patent Application Nos. 61/650,866, filed May 23, 2012 and 61/490,952 filed May 27, 2011. U.S. patent application Ser. No. 15/002,225 filed Jan. 20, 2016 and Ser. No. 15/154,861 filed May 13, 2016 are also both continuations-in-part of U.S. patent application Ser. No. 13/096,764 filed Apr. 28, 2011, which claims priority of U.S. Provisional Patent Application Nos. 61/416,629, filed Nov. 23, 2010, 61/367,576, filed Jul. 26, 2010, 61/367,547, filed Jul. 26, 2010 and 61/330,226, filed Apr. 30, 2010.

The entire contents of all of the above-identified applications are herein incorporated by reference.

FIELD OF THE INVENTION

The present invention relates generally to Internet of Things (IoT) Security and Management and more specifically to system and method for IoT security and management.

BACKGROUND

Many businesses, organizations, governments and others that are responsible for the security, operations, support and maintenance of Internet of Things (IoT) devices are increasing confronting challenges. IoT devices are increasingly performing important roles in many areas of a modern economy, including facilities for manufacturing, utilities, distribution, recreation, military, residential, commercial, healthcare and others. In addition, IoT devices are incorporated into manufactured products that may or may not be associated with the above facilities such as, automobiles, aircraft, medical devices, etc. For such product manufactures, protecting, controlling and managing the IoT devices (which are typically manufactured by third-parties) can be challenging, fraught with danger, risk or potential liability. It is desirable for both manufactured products (together with their incorporated IoT devices) as well as for enterprises deploying IoT devices in their operating facilities (e.g., a factory, utility grid, etc.) to ensure control over the data that is produced, exert access control so that unauthorized, random parties cannot get access to the device, have the ability to instruct a device(s) to only listen to authorized parties, have the ability for a device(s) to ignore unauthorized parties, and/or to provide strong identity management for typical IoT device(s) and devices that may be within such operating IoT devices to external, authorized systems or entities. It is also desirable for typical devices to be configurable and easily updatable only with authorized, verified firmware.

SUMMARY

In some embodiments, the disclosed invention is a method for establishing a secure communication between a plurality of IoT devices, the method including: provisioning a first and a second IoT devices by providing a unique identification, a digital identity token and a cryptographic key to and issuing a first digital certificate to each of the first and second IoT devices; inviting the second IoT device by the first IoT device to establish a communication line with the first IoT device by receiving a digital token from the second IoT device, authenticating the second IoT device using the unique identification, the digital identity token and the cryptographic key of the second IoT device; establishing a secure communication line between the first IoT device and the second IoT device by authenticating the established communication line and issuing a second digital certificate to the communication line between the first IoT device and the second IoT device; and preventing a third IoT device for which a secure communication line to the first or second IoT device has not been established from communicating with the first or second IoT device In some embodiments, the disclosed invention is a method for establishing a secure communication between a first Things (IoT) device and a second IoT device, each IoT device including a unique identification, a digital identity token and a cryptographic key. The method includes: establishing an unsecure communication line between the first IoT device and the second IoT device; providing a first digital certificate to each of the first and second IoT devices; authenticating the second IoT device by the first IoT device using the unique identification, the digital identity token and the cryptographic key of the second IoT device; authenticating the unsecure communication line between the first IoT device and the second IoT device; providing a second digital certificate to the communication line between the first IoT device and the second IoT device to establish a secure communication line between the first IoT device and the second IoT device; and preventing a third IoT device for which a secure communication line to the first or second IoT device has not been established from communicating with the first or second IoT device.

In some embodiments, the disclosed invention is a system for establishing a secure communication between a plurality of IoT devices. The system includes: a first IoT device including a first unique identification, a first digital identity token and a first cryptographic key; a second IoT device including a second unique identification, a second digital identity token and a second cryptographic key to establish a communication line with the first IoT device by receiving a digital token from the first IoT device, authenticating the first IoT device using the first unique identification, the first digital identity token and the first cryptographic key of the first IoT device; and an attribute authority (AA) for providing a first digital certificate to the first IoT and second devices, establishing a secure communication line between the first IoT device and the second IoT device by authenticating an established communication line between the first IoT device and the second IoT device, wherein a third IoT device for which a secure communication line to the first or second IoT device has not been established is prevented from communicating with the first or second IoT device.

In some embodiments, the method and system may include a digital agreement establishing terms of use of the secure communication line between the first and second IoT devices.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
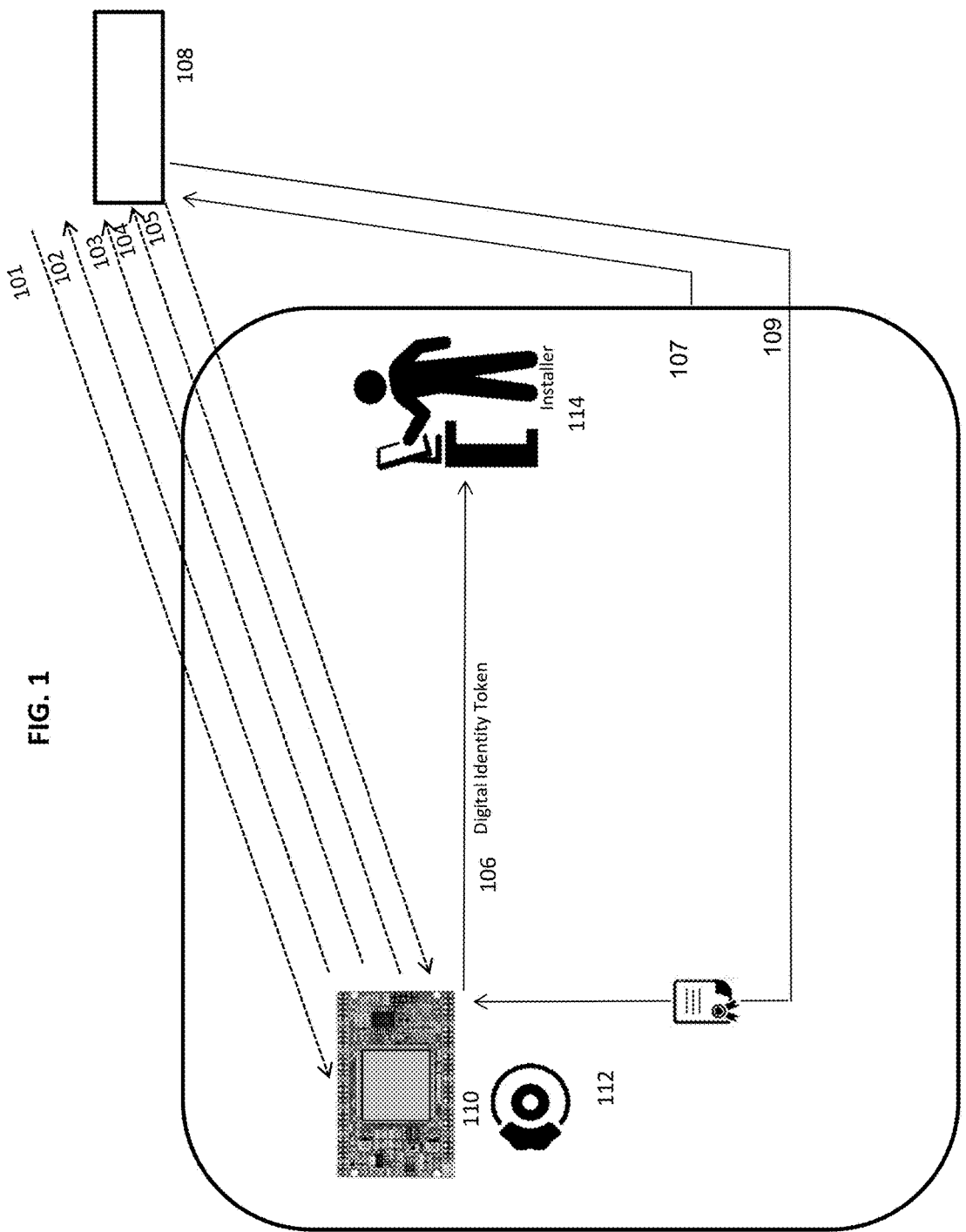
FIG. 1 shows a security system for performing an exemplary provisioning process for a IoT device, according to some embodiments of the disclosed invention.

In some embodiments, the security ecosystem of the disclosed invention provides many of the above mentioned capabilities through the use of a central server configured with one or more of an attribute authority (AA) acting as a trusted third party mediating service provider by using one or more of a public key infrastructure (PKI), including one or more of a certification authority, registration authority, hardware security module (HSM), validation authority (VA, possibly by online certificate status protocol, OCSP, or certificate revocation list, CRL), a privilege management infrastructure (PMI), virtual network protocol (VPN) technology, device-side client applications, cloud hosting, authentication and light active directory access protocol (LADP). In some embodiments, the security ecosystem of the disclosed invention may also provide specifications to third-party IoT device manufacturers (whose IoT products may later be managed by the security ecosystem) combined possibly with other solutions. Current typical industry practice is to only issue a certificate to each endpoint from a central certification authority (CA). However, the security ecosystem of the disclosed invention not only issues certificates to endpoints, but it also issues certificates to each authenticated communication line 705 that pairs of endpoints may establish (have established) and use.

In some embodiments, this security ecosystem may result in real time management of credentials, identity profiles, communication lines, and/or keys. It is capable of distributing tunable rights to authorized users/devices. Using a security ecosystem's user-managed, device-managed, operator-managed, or artificial intelligence-managed inviter-invitee protocol suite, inviters may vouch for the identity of the invitees who may successfully complete the protocol establishing secure communication lines, for example, with identity support information supplied by the security ecosystem. Users/devices may establish and respond to authorization requests and other real-time verifications pertaining to accessing a typical communication line (not an endpoint), which may share encrypted communications.

Typically, a communication line may be accompanied by a digital agreement establishing terms (e.g., rules and/or business logic) of the use of the communication line between the endpoints. These agreement are generally auditable, brokered, trusted-relationships where such relationships/digital agreements may each stand-alone (generally for privacy) or may leverage the build-up of identity confidence levels across relationships. These relationships may be organized into defined "groups". In some embodiments, a cryptographically-secured group may include all or one or more subset group of the devices incorporated within a single manufactured product, for example, in different embodiments, a group may encompass endpoint IoT devices within an automobile, aircraft, medical device, household appliance and the like.

According to some embodiments of the disclosed invention, individually manufactured IoT devices as well as manufactured products (which incorporate IoT devices) include one of more of the following capabilities. They ensure control over data that is produced, which may include protection of data (e.g., using encryption) and possibly movement of the data; exert access control so that unauthorized, random parties cannot get access to the devices; have the ability to instruct the device to listen only to authorized parties so that man-in-the-middle attacks can be prevented or mitigated. These devices may also provide strong identity management, not only for multiple IoT devices that may be within the product, but also from the product to external, authorized systems or devices.

Many devices may be configurable and easily updatable only with authorized, signed firmware code that is signed using a private key that corresponds to a subject public key within typically a code signing certificate issued by a certification authority recognized by a host computer or device. One example of a manufactured product that may benefit from the solution described herein is an automobile. There have been a number of reports of automobiles having been remotely hacked. Once having access to the system, the hacker was able to use the automobile's controller area network (CAN) bus to access and take at least partial control over multiple electronic control units (ECUs): such as engine, brake, speed, steering, and/or others. The disclosed invention may be applicable to a variety of ECUs such as human machine interface, engine control unit, transmission control unit, steering control unit, telematics control unit, speed control unit, battery management system, seat and door control units, and the like.

In some embodiments, the disclosed invention leverages the unique properties of a secure component or a physically unclonable function (PUF), and provides one or more of: a foundation for reliably establishing the identity of an IoT device, solves gaps of traditional firewall security, authenticates remote identities, exchanges authenticated public keys, prevents random device access, protects and controls data, and/or updates devices with signed firmware.

In some embodiments, the devices incorporating the disclosed invention are capable to control and use protected cryptographic keys. In some embodiments, multiple IoT devices may be used together in a coordinated manner or in an assembled product in order deliver a complex or integrated solution that could otherwise require specialized skill sets, by integrating IoT devices (which incorporate cryptographic and security capabilities according to the disclosed invention) into an assembled product.

For the purposes of the system of the disclosed invention, IoT devices are endpoints and are generally composed of two broad types as follows.

"Control IoT" or "CIoT" devices are the type of client IoT devices that may also be used to control or manage one or more similar IoT devices or IoT devices of a more limited nature. For example, CIoT devices could include an ECU in an automobile.

A "Limited IoT" or "LIoT" device typically does not include the processing or memory capacity or other capabilities of a typical CIoT devices (with greater memory, processing power, etc.). LIoT devices could include sensors, switches, actuators, controllers, and the like.

Considering the limited processing and other capabilities of a LIoT device, all or portions of the ecosystem system's complete inviter-invitee provisioning protocol may be installed into the device in a partially pre-completed state during its manufacturing process. Also, pre-assigned on such a LIoT device may be a unique protocol address or identifier assigned to the device and keys for one or more trusted CIoT devices or other trusted devices within the security ecosystem. For example, public keys could be provided to designate to LIoT devices when those public keys are associated with devices or endpoints that the LIoT device is to trust. These would be devices that might offer trusted services to the LIoT device, such as a firmware-signing authority, administer/user-controlled device, trusted management device (e.g. a CIoT), Trusted Group devices or others. Throughout this disclosure, the terms "IoT device" or "IoT endpoint" may be used to refer to either a CIoT or LIoT device. The terms "device" or "endpoint" may refer to an "IoT device", "IoT endpoint", user/endpoint, CIoT, LIoT device, "container" or user-controlled device such a mobile device, computing device, etc.

Typically, assignments of limited Iot (LIoT) devices may be reported to, managed or controlled by a control IoT (CIoT) device. Based on the information described above being collected and certified by a CIoT device, an AA could create a digital certificate for each LIoT device with the collected, verified information. For example, such a digital certificate could include a device's unique identifying information, its device type and capabilities. It may also include the LIoT device's relationship to a CIoT device(s), address, installed location, inviter-invitee provisioning process relationships, group membership, manufacture's certification and other information as appropriate. Such certificates may be automatically and continuously updated and maintained throughout the life cycle of the product.

The security ecosystem of the disclosed invention allows for multiple methods of provisioning the device to achieve an endpoint unique identity for the device. In some embodiments, an IoT device manufacturer's specification may be created by which manufactures of IoT devices or products incorporate IoT devices (such as: televisions; refrigerators; security systems; thermostats; and the like) to incorporate the technology into their devices at the time of manufacture. In some embodiments, this technology may be in the form of fully custom digital logic, IP logic blocks incorporated into the device's existing digital logic, programmable logic implemented using FPGA technology built into the device, fully custom firmware included with the device's own custom firmware, or an open-source or proprietary firmware stack added to the device's firmware. For devices with updateable programmable logic resources and/or firmware, this technology could also be embodied in the device after the time of manufacture Some embodiments of conformance with the specification would be for the firmware of the IoT device to support a device's adherence to any rules included in the digital agreement that is typically recorded in a digital certificate attesting to a communication line between that endpoint device and another endpoint and establishing terms (e.g., rules and/or business logic) of the use of the communication line established between the endpoints. Such specification may also require that IoT devices only communicate to previously authenticated endpoints and no others. An IoT device endpoint may have communication lines typically established between it and one or more other endpoints, typically a device with which it needs to communicate in order to meet operational or other needs.

The rules, procedures, policies described herein may be incorporated in a written specification to be provided to a manufacturer of an IoT device, as well as possibly the various supply chain suppliers to that manufacturer (e.g., chip, field programmable gate arrays (FPGA) or others) in order for them to design, produce, manufacture, assemble or otherwise contribute to the creation of IoT devices that integrate with the security ecosystem. Included in such a spec may be methods for the security ecosystem to manage secure firmware updates of all managed IoT devices.

Specification-conforming device firmware of such an IoT device endpoint would reject or ignore communication from any unknown endpoint that has not previously been authenticated through the establishment of a secure communication line, and would talk only to previously authenticated endpoints with established communication lines and supported by digital certificates. Device firmware may initially conform with the specification or may be brought into conformance with the specification by way of a firmware update at a later time. An IoT device can be made in conformance with the spec or as a more basic device onto which the device's owner (e.g., owner, manufacturer, or others who desire to increase the security and manageability of the IoT devices that they may own or control) could install an appropriate application that would cause such device to perform as an IoT device in general conformance with the spec and described functionality of the security ecosystem.

By applying principles and procedures similar to those described for a manufacturer of products (that incorporate IoT devices) and making use of the capabilities of the security ecosystem, an owner could enhance the security of such acquired or controlled IoT devices, as well as enhance the owner's management and control over such owned or controlled IoT devices, as well as possibly obtain other of the capabilities, features and/or benefits described in this application. Moreover, all or portions of the provisioning steps may be done by an IoT device manufacturer, and/or all or portions may be done by (or on behalf of) a device customer.

In some embodiments, an IoT device manufacturer may be provided with comprehensive installation support procedures as well as configuration options to utilize to optimize both their manufacturing process and operational performance. Within the security ecosystem environment, an IoT device can be assigned a unique address, for example an internet protocol (IP) address or other identifier, as a step in its manufacturing process or, if desired, when the device is put into service. The address can be securely stored on the IoT device in a re-writable memory facility or in a permanent fashion in a secure component. The security ecosystem device manufacturing specification may require the device address to be visible on the device itself via alpha/numeric or QR code, or both.

The specification allows a device to optionally be programmed such that when the device powers up, it broadcasts a confirmation message, such as a "Hello" message with its address, together with other identifying information such as its model number, serial number, public keys, current white list, current firmware version, etc. One example of the use of this feature is during the period when components are being installed in automobiles at a manufacturing facility. At any time during testing, assembly, installation, quality inspections, etc. a technician may power and test devices, thereby capturing a device's unique "hello" message that comprehensively identifies that device. This feature could be useful to catalogue and assign a specific device a designation associated with an installation location in an automobile (This messages may later be disabled).

In some embodiments, an unalterable manufacturer certification prior to IoT device delivery may be included in the specification for IoT device manufactures. Such non-refutable certification can be in one of multiple acceptable forms such as a PKI certificate or other a digital token stored in a secure component, or a physical data record on the device that is locally or remotely readable. At the time of manufacture of IoT devices intended for incorporation into the security ecosystem of the disclosed invention, the manufacturer may be asked to certify one or more of the following: (a) all communication leaving or being received by the device may be controlled by a specified application running on the IoT device (e.g., that the device firmware recognizes and supports the secure communication lines technology of the security ecosystem), (b) all or designated communications leaving or being received by the device may only be sent to IP addresses on an updatable white list and/or addresses associated with entities authenticated through an inviter-invitee protocol and/or otherwise provided to the device by an authorized endpoint, (c) additional conditions as may be deemed appropriate, and (d) that no manufacturer certification is made.

In some embodiments, in the case of some IoT devices a unique identifier or cryptographic key may be pre-installed during the manufacturing process of the device, or in some cases injected after the manufacturing of the device. In some embodiments, a trusted platform module (TPM) or physically unclonable function (PUF) may be used to provide a unique identity or cryptographic key on the device. With PUF technology, security keys and unique identifiers can be extracted from the innate characteristics of a semiconductor within a device. These unique keys are typically only generated when required and typically don't remain stored on the system, hence providing a high level of protection. The unique key generated with PUF technology allows for the bootstrapping of a cryptographic system (such as what is needed within the IoT/endpoint client of the security ecosystem) to establish a root key. In some embodiments, the cryptographic algorithms and/or keys are protected or separated from the application software/firmware in some security subsystem inside the device.

In some embodiments, the security ecosystem IoT device client application may be installed onto a Field Programmable Gate Array (FPGA), other types of integrated circuits (ICs). For example, an FPGA, a controller or microprocessor may be provisioned with an IoT device client which may include one or more of a local key store module (LKSM), a security ecosystem assigned globally unique identifier (GUID) assigned to the device, public keys that are associated with devices, and endpoints that the IoT device is to trust (e.g., a firmware-signing authority, IoT management device; IoT support group; etc.). The LKSM typically includes the encryption management system (e.g., it may provide symmetric, asymmetric, elliptic curve, and/or cryptographic functionality) in the device that manages, for example: (a) a key pair for signature generation and signature verification, (b) key pair(s) for encryption and decryption, (c) symmetric key for verifying integrity of data, (d) cryptographic wrapping/unwrapping of digital asset-specific keys (that were initially generated potentially by a device client or cryptography microprocessor or potentially by a security ecosystem server or other), some of which may be installed in a secure component.

FIG. 1 shows an exemplary provisioning process for an IoT device, according to some embodiments of the disclosed invention. Typically an installer with a computing device 114 would oversee this process or by an IoT device with internal intelligence or a computing device controlled by a program, such as an artificial intelligence program, may control the process. If the security ecosystem's client app has not been previously installed on the IoT device, it is downloaded (101) from the installer's computing device (114) or from a security ecosystem platform 108. The security ecosystem platform 108 includes one or more of a PKI, PMI and AA and more. A unique GUID may be associated with the client instance during client installation that being registered with the security ecosystem in 102 (e.g., transferred via the installer's computing device 114). If not previously generated, a unique PUF-generated ID may be created on the device, in 103. The crypto capability on a processor within the device may create one or more public/private key pairs with at least one public key being transferred to the security ecosystem 108 directly or via the installer's computing device 114; also transferred may be device identifying information such as its model number, serial number, type name, current white list, current firmware version, etc. in 104.

A certificate is provided by the AA to the device attesting to the device's identity with one or more of the following: device client GUID, device ID, device public key, device public identity (e.g., type name, serial number, etc.), in 105. The device may create and sign a digital identity token (DIT as further described in the following section) asserting the device's identity, including one or more of: the device's specifications; identity; role or function; its public key; and possibly other information, in 106. This DIT can be presented to the installer computing device or possibly to the security ecosystem (or in other embodiments to an IoT device with internal intelligence or to a computing device controlled by an artificial intelligence computer program), which reviews and confirms the device's assertions and, in turn possibly certifies its confirmation to the device's assertions thereafter digitally signing the device's digitally signed assertions and sending that to the security ecosystem, in 107. Optionally, the security ecosystem may review these assertions and may create an attribute certificate or DIT affirming them, in 108. The security ecosystem may provide public key certificates of other devices and/or groups that the IoT device is to trust (e.g., firmware signing authority; automotive maintenance group as described in more detail later in this application) and to digitally sign them certifying that they are to be trusted, and then provide the public key certificates to the IoT device, in 109 (possibly transferred via the installer's computing device 114). In some embodiments, a CIoT device (as described herein) may be substituted for an installer's computing device in one or more of the above steps.

In some embodiments, IoT device are provided with a DIT. Typically, DIT tokens may be created from within an existing IoT device client thereby taking advantage of the digital signing capability of that IoT device client. The token typically includes the digital signature of that issuing device. In step 107, the token may be created with a configurable variety of identifying fields. In the case of an IoT device, these could include: device manufacturer, serial number, device type, device model, GUID, date of issuance, etc.

In some embodiments, secure boot and software attestation functions are provided to detect tampering with boot loaders and/or critical operating system files by checking their digital signatures and product keys. Invalid files are blocked from running before they might attack or infect the system or device, giving an IoT device a trust foundation when operating. Additionally, a trusted execution technology using cryptographic (or other) techniques to create a unique identifier for a subject component, enabling an accurate comparison of the elements of a startup (or operating) environment against a known good source and arresting the launch of code that does not match (or sending an alert to an appropriate device or endpoint or the security ecosystem). In some embodiments, detection may be a digital fingerprint of the device firmware installation, such as a PUF. Such a fingerprint (or cryptographic hash or other derivative thereof) may be incorporated into a DIT or digitally signed and used as a separate verification. One or more of these components could be integrated in one or more separate processors. (See for example, FIG. 1, steps 105 and 109).

In some embodiments, the provisioning process would also include the addition to the LKSM or secure component or other acceptable storage of public keys associated with trusted users, devices, entities, etc. For example, one of the most important added public keys to be trusted would be from the security ecosystem and be the signer of the Public Key Certificates of all future trusted public keys to be used.

Trusted verification can be accomplished in a number of ways. In some embodiments for the assembly of an automobile, the security ecosystem issues a unique ID or pubic key certificate to be trusted, in the form of a digital certificate to the newly installed IoT device firmware client of the brake control unit to which only that IoT device client would have access (e.g., by using the public key of the IoT device client of the brake control unit). The IoT device client of the brake control unit could singularly decrypt that unique ID. The IoT device then creates a digital signed token composed of that unique ID possibly encrypted using its private key and return it to the security ecosystem.

The security ecosystem verifies that the IoT device client of the brake control unit provided an acceptable digital token confirming it uniquely has received the unique ID and/or public key certificate of devices to be trusted. The security ecosystem then creates a message confirming the correct key validation digitally signs it using the private key associated with the public to be trusted, and returns it to the IoT device client of the Brake Control Unit. The veracity of the signed confirmation is verified using the public key to be trusted and the confirmation is complete. Thereafter, additional trusted keys may be added and other verified messages from the security ecosystem may verified through this or a similar digital signing capability. Examples of trusted entities whose trusted public keys could be added include: code signing authorities; a maintenance group; specified devices; etc.

In some embodiments, provisioned IoT devices may be added through the use of an inviter-invitee Protocol for IoT devices. The determination for specific relationships between designated IoT devices may be made by a number of authorized entities such as: users; the security ecosystem; a master IoT device management entity (e.g., a CIoT device); an IoT device with internal intelligence; an Artificial Intelligence (AI) system with access to the security ecosystem (e.g., the PKI/PMI and/or to the Attribute Authority) and directing the actions of the security ecosystem; etc. One or more of these may utilize the security ecosystem to instruct a designated IoT device to establish a secure communication line with one or more other designated IoT devices, including the establishment of rules and/or business logic (or possibly limited to the modification of existing rules and/or business logic). A proper instruction typically will include appropriate identification of both inviter and invitee devices, together with digitally signed authorization for such requests.

To facilitate authentication in the inviter-invitee process, the AA of the security ecosystem may provide to either or both of the inviter-invitee a question and/or the answer to that question to be used during the inviter-invitee protocol. Through such a security ecosystem directed or approved process, devices (possibly through the added use of an artificial intelligence capability or by an IoT device with internal intelligence) may be capable of executing such instructions with or without the need direct human intervention or action and establish secure communication lines between them with the support of a trusted third party AA. In some embodiments, the inviter-invitee process is controlled or managed by a human installer or by an automated process. Successful execution of the inviter-invitee protocol for IoT devices results in the establishment of the desired communication line and an attribute certificate with a digital agreement (as described herein) being created and recorded by the security ecosystem's AA, which is X.509 compliant in some embodiments.

Figure 2:
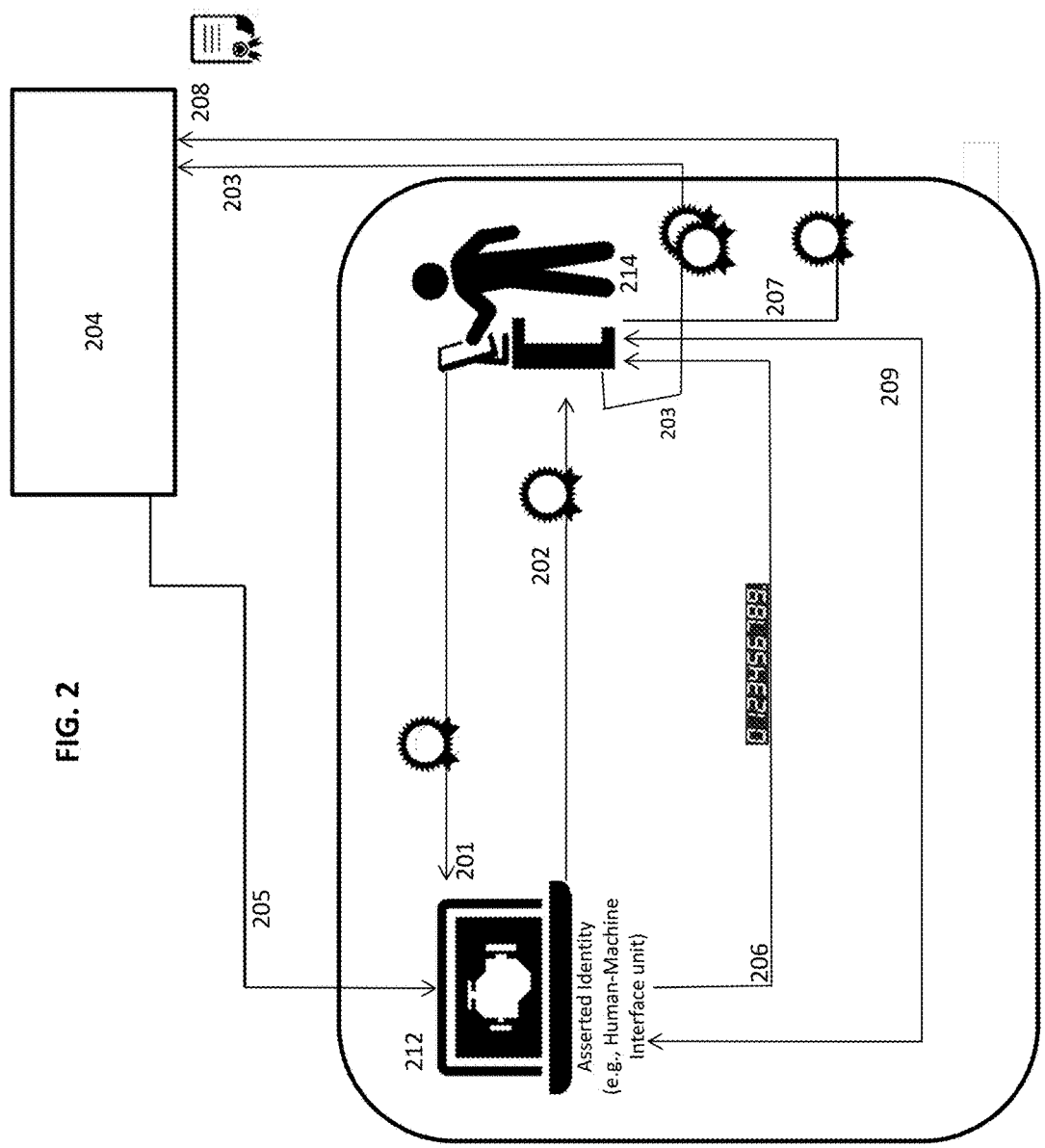
FIG. 2 depicts a security system for inviting an IoT device to mutually establish a secure communication line, according to some embodiments of the disclosed invention.

FIG. 2 depicts a security system for inviting an IoT device to mutually establish a secure communication line, according to some embodiments of the disclosed invention. This figure illustrates an automotive use case example of a security ecosystem user/endpoint (e.g., a system or device installer 214) wishing to invite a human machine interface unit 212 to join security ecosystem 204 and the systems installer wishes to be able to know, with certainty, that the IoT device client subsequently identified as belonging to the identified human machine interface unit was installed and is controlled for this specific human machine interface unit and has not been co-opted by a fraudster. The security ecosystem platform 204 includes one or more of a PKI, PMI and AA and others. Also the installer 214 may want to know that this human machine interface unit IoT device client is the only one on the security ecosystem network. Through a process of chain of custody of digital records to and from that IoT device, client may be certified by the security ecosystem.

When a new user/device (in this exemplary case the human machine interface unit 212) is invited (201) and goes through the IoT device client installation process, it may be asked whether it has a digital identity token. If so, the IoT device client loads the digital identity token shown by 202. The installer 214 may provide its certification to the DIT and transmit it to the security ecosystem, in 203. The security ecosystem network may then examine the token for authenticity, shown by 204. Each token is unique and may only be installed for a single security ecosystem user. In some embodiments, an additional out-of-band confirmation of successful installation is included for that IoT device client. An example of out-of-band confirmation may be included in the verification process whereby the security ecosystem 204 issues a unique ID (which may be encrypted using the public key of the human machine interface unit) to the newly installed IoT device client of the human machine interface unit to which only it would have access, shown by 205. IoT device client of the human machine interface unit 212 would then provide that unique ID (possibly digitally signed using its private key) to the confirming systems installer, in 206.

In some embodiments, the system's installer certifies to the security ecosystem 204 that he has personally confirmed with human machine interface unit 212 the completion of installation, and optionally includes such a unique ID with his certification to the security ecosystem, for example, through use of his own client application, in 207. Such a confirmation (particularly with the use of a one-time-only unique ID issued by the security ecosystem) would confirm the completion of a secure installation link and thereafter is able to support the future chain of custody of digital records sent between that IoT device client and other verified security ecosystem IoT device clients, as shown by 209. In some embodiments, the described inviter-invitee process generates audit trails based, in part, on digital signatures. Moreover, other actions and activities of the security ecosystem 204 may generate audit trails based, in part, on digital signatures.

The successful completion of the invitee processing may be understood to imply acceptance of any digital agreement(s) proffered by the inviter. This may involve use of a signature generation private key by the invitee's host computer/client/device that corresponds to a subject public key within a certificate that is referenced by a newly generated attribute certificate owned by the invitee. In some embodiments, an X.509 protocol Attribute Certificates (ACs) underlie inviter and invitee processing. As a result of the inviter-invitee processing, the security ecosystem 204 pairs, under mutual agreement, an enterprise-level managed identity with a unique communication line to each authenticated and authorized user/endpoints.

Figure 3:
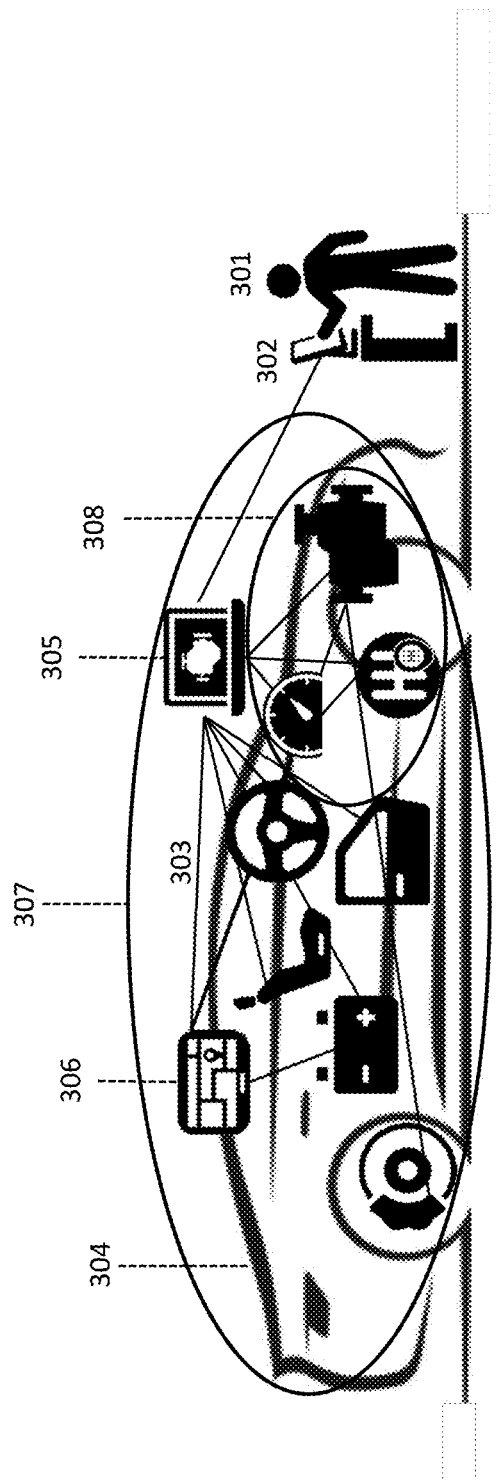
FIG. 3 illustrates a security system for establishing secure communication lines between multiple pairs of IoT devices in a vehicle, according to some embodiments of the disclosed invention.

FIG. 3 illustrates a security system for establishing secure communication lines between multiple pairs of IoT devices in a vehicle, according to some embodiments of the disclosed invention. Through the use of one or more methods of device provisioning and an inviter-invitee process, users/devices and/or the IoT devices within a manufactured or assembled product are able to establish unique presence, authenticate and link respective identities with devices, and establish authenticated, verified and secure communication lines between each other. This may be done by devices or devices supervised by an installer 301 operating an end user device 302, multiple human-operated end user devices, or end user device(s), via a human machine interface control unit 305. These may optionally be used in the formation of relationships between devices 303 (e.g., a human-machine interface control unit 305 and a telematics control unit 306) that with the addition of other similarly paired devices may be organized into defined groups. For example, a cryptographically-secured group may include all of the devices together with their communication lines that may be incorporated within a single manufactured product, such as a vehicle 304, aircraft, medical device, etc. to establishing secured, protected and auditable communication to and from that group 307. One or more subgroups of devices may be formed within a group 308 or possibly in a combination of devices with a group and devices outside of the group. Further, the record of the group members, their information, communication lines between the members, group membership and/or other pertinent information may be established, recorded and/or revoked in a security ecosystem. Device group membership as well as rules associated with membership in that group may be included on a certificate that is added (directly or indirectly by an AA) to one or more communication lines of devices within that group.

Figure 4:
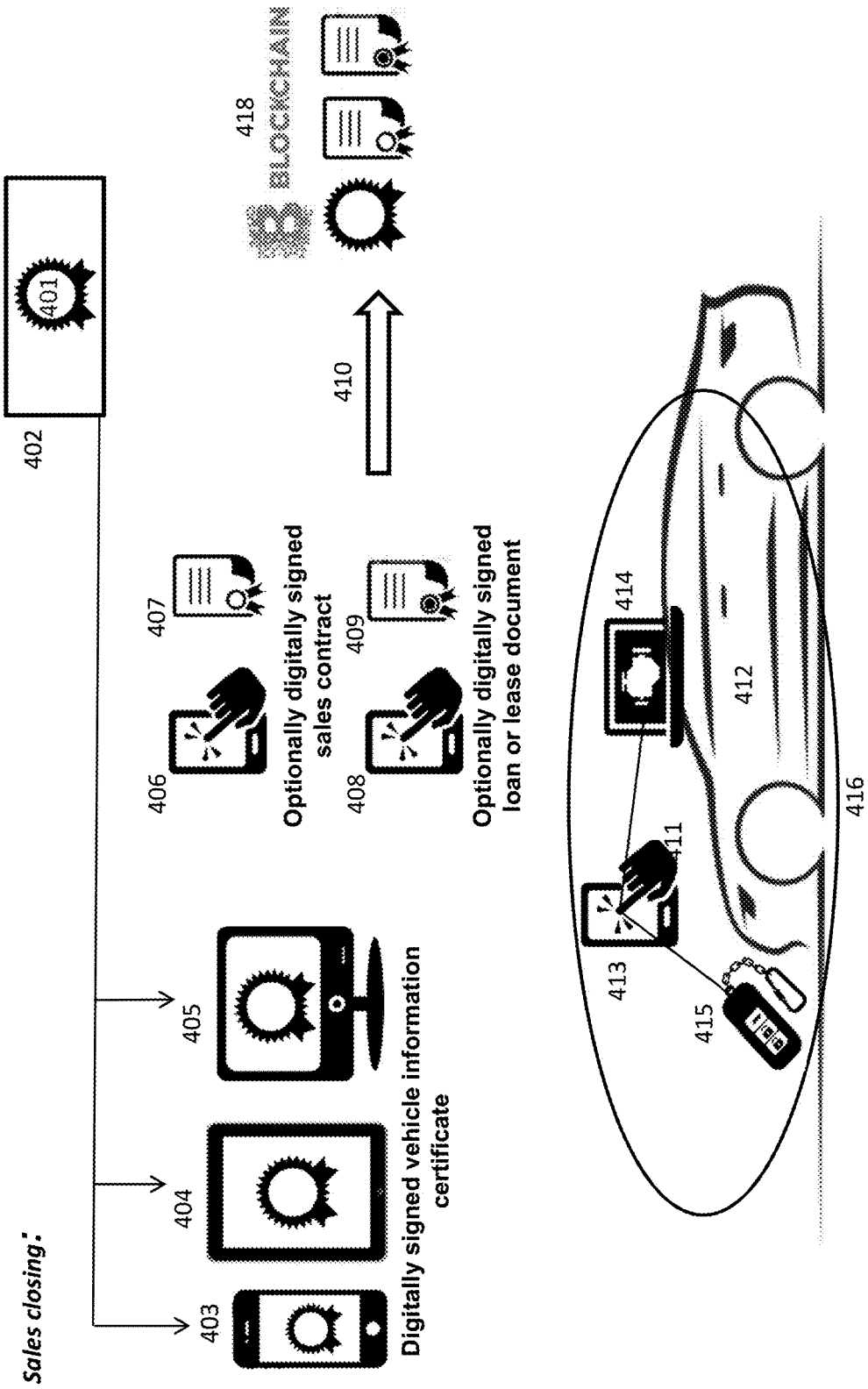
FIG. 4 shows a security system for authenticating a new product including IoT devices, according to some embodiments of the disclosed invention.

FIG. 4 shows a security system for authenticating a new product including IoT devices, according to some embodiments of the disclosed invention. Manufactured products incorporating IoT devices are typically sold or otherwise provided to buyers, lessees, or other end users. In some embodiments, such a product could be a car with a buyer 411 buying a car 412. In such a case a buyer's purchase is made more secure through the incorporation of a digital certificate 401 encompassing pertinent and authenticated information about the car, the IoT devices associated with the car and other information. Such a digital certificate 401 could be delivered from a security ecosystem 402 to a buyer's mobile device 403, tablet device 404, computer 405 or other devices. The security ecosystem platform 402 includes one or more of a PKI, PMI and AA. The buyer 411 may execute his/her purchase contract, for example, with a digital signature using a security ecosystem supported mobile device 406 that has been authenticated through the security ecosystem. These digital records 407 may then be transferred to a lender or other interested parties and a lease or a loan agreement might also be digitally signed (408).

A record of the purchase combined with a digital record of the car (and possibly a lease or loan document (409)) is then recorded (by a lender, security ecosystem or other) in an immutable manner (410). One example of such a recording may be on a Blockchain™ or similar media 418, as shown by 410. The buyer 411 and car's relationship may also be authenticated with each other, with a buyer's client application on a buyer device 413, and with both the car (through one of its IoT devices 414) and the car's passive key and entry system (key fob device) 415. The buyer's mobile device, the car and the passive key entry system will then all become members of an authenticated group, for example an "IoT Devices Group" 416.

Figure 5:
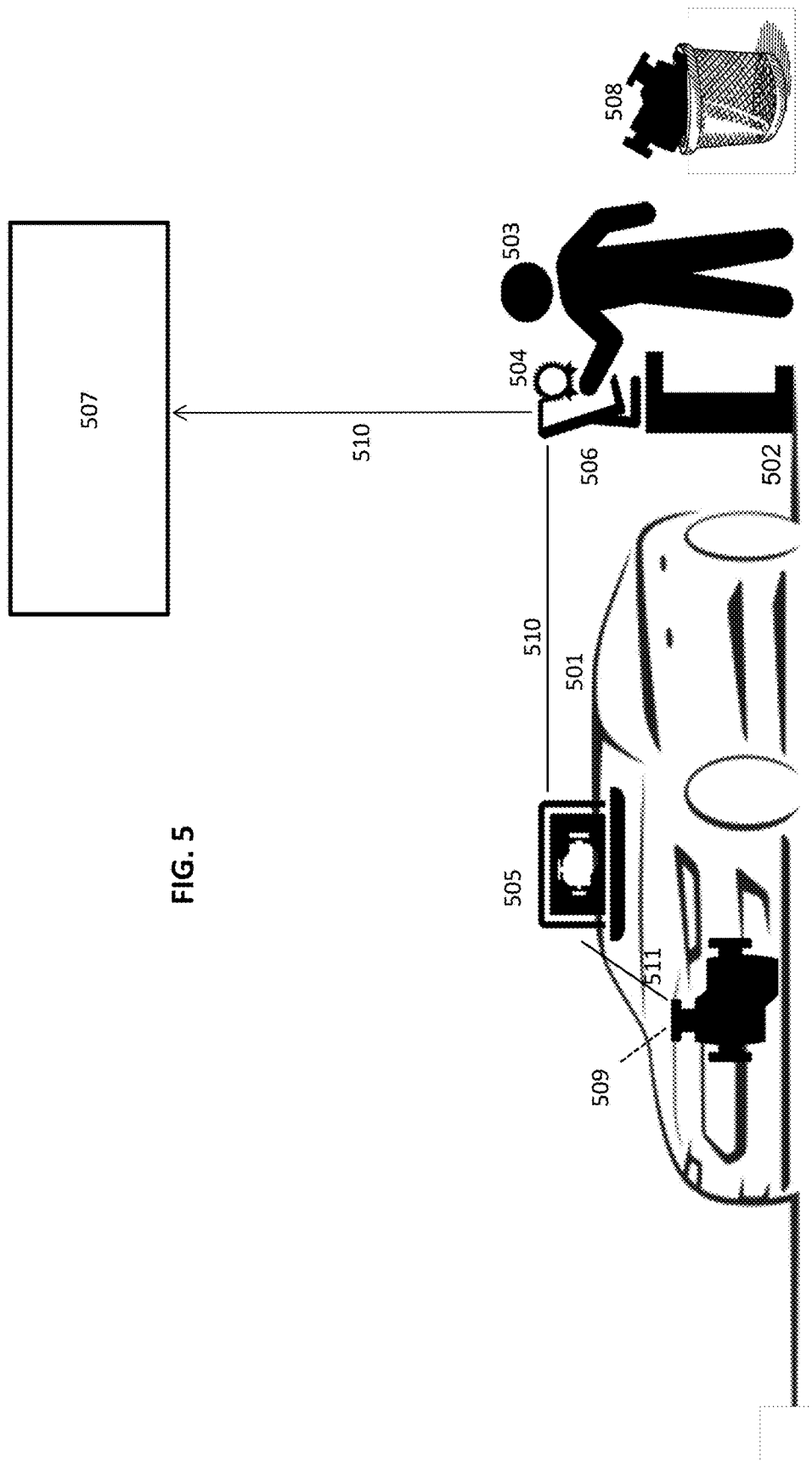
FIG. 5 shows a security system for maintenance of a product including IoT devices and their possible replacement, according to some embodiments of the disclosed invention.

FIG. 5 shows a security system for maintenance of a product including IoT devices, according to some embodiments of the disclosed invention. When bringing a product, for example, a car 501 to an automobile dealership 502 for maintenance, access to the internal IoT devices of the car can be protected by the security capabilities that were previously installed in the car 501. For example, a mechanic 503 seeking access 510 would have to have appropriate credentials 504 to access the car's human-interface control unit 505 through an application on terminal device 506 that had previously been registered within a security ecosystem 507. The mechanic, the application or other acceptable identity would have to demonstrate proper authentication for this purpose. For example, one of them may be an authenticated member of a dealer maintenance group with privileges to access IoT devices within the car with definable rights to conduct specified types of maintenance work on the car. For example the mechanic may determine that the engine control unit is defective and remove it (508) and then install a replacement (509). The mechanic would typically delete the defective engine control unit from the car's records within the security ecosystem 507 and replace it with a new engine control unit record. The replacement process would include appropriate inviter-invitee process between IoT devices 511 (and possibly provisioning process, as described previously), and updating 510 of records for the car 501, to reflect the IoT device replacement and its updated IoT device group within the security ecosystem 507. The security ecosystem platform 507 includes one or more of a PKI, PMI and AA.

Figure 6:
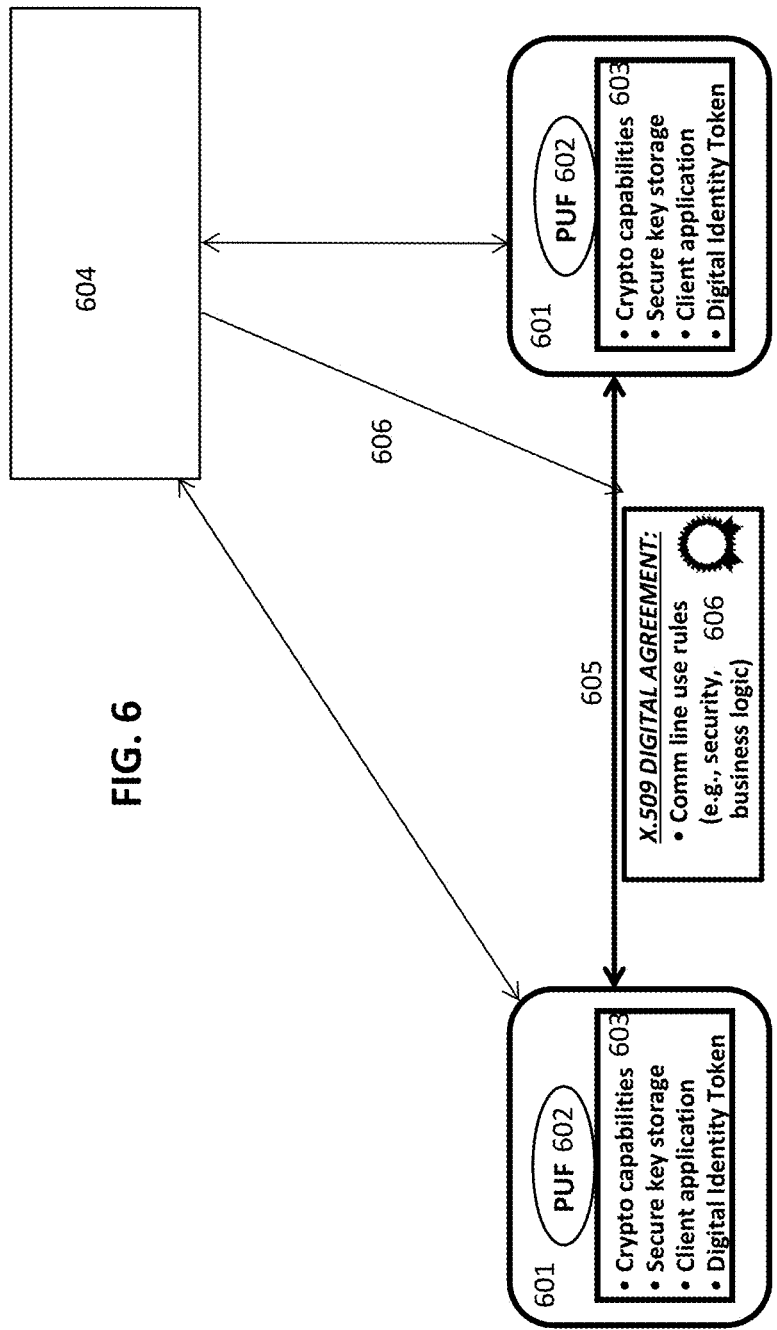
FIG. 6 depicts some elements of a secure and authenticated communication line, according to some embodiments of the disclosed invention.

FIG. 6 depicts some elements of a secure and authenticated communication line, according to some embodiments of the disclosed invention. As shown, an IoT endpoint 601 should typically have a secure root key provisioned as a method or establishing a unique identifier or cryptographic key on the device. One method of doing this is through the use of a PUF 602. Cryptographic algorithms, secure key storage and client application are provided on the device. A unique DIT is created on by the device 601 or may be provided by the security ecosystem 604. The security ecosystem 604 includes one or more of a PKI, PMI and AA. Through the application of an inviter-invitee process between two endpoints 601/601 and with facilitated support from an AA within the security ecosystem 604, those endpoints can establish a secure, authenticated communication line 605 between them. Typically, a communication line is accompanied by a digital agreement that may be recorded in a digital certificate attesting to the communication line and establishing terms (e.g., rules and/or business logic) of the use of the communication line established between the endpoints 606.

Figure 7:
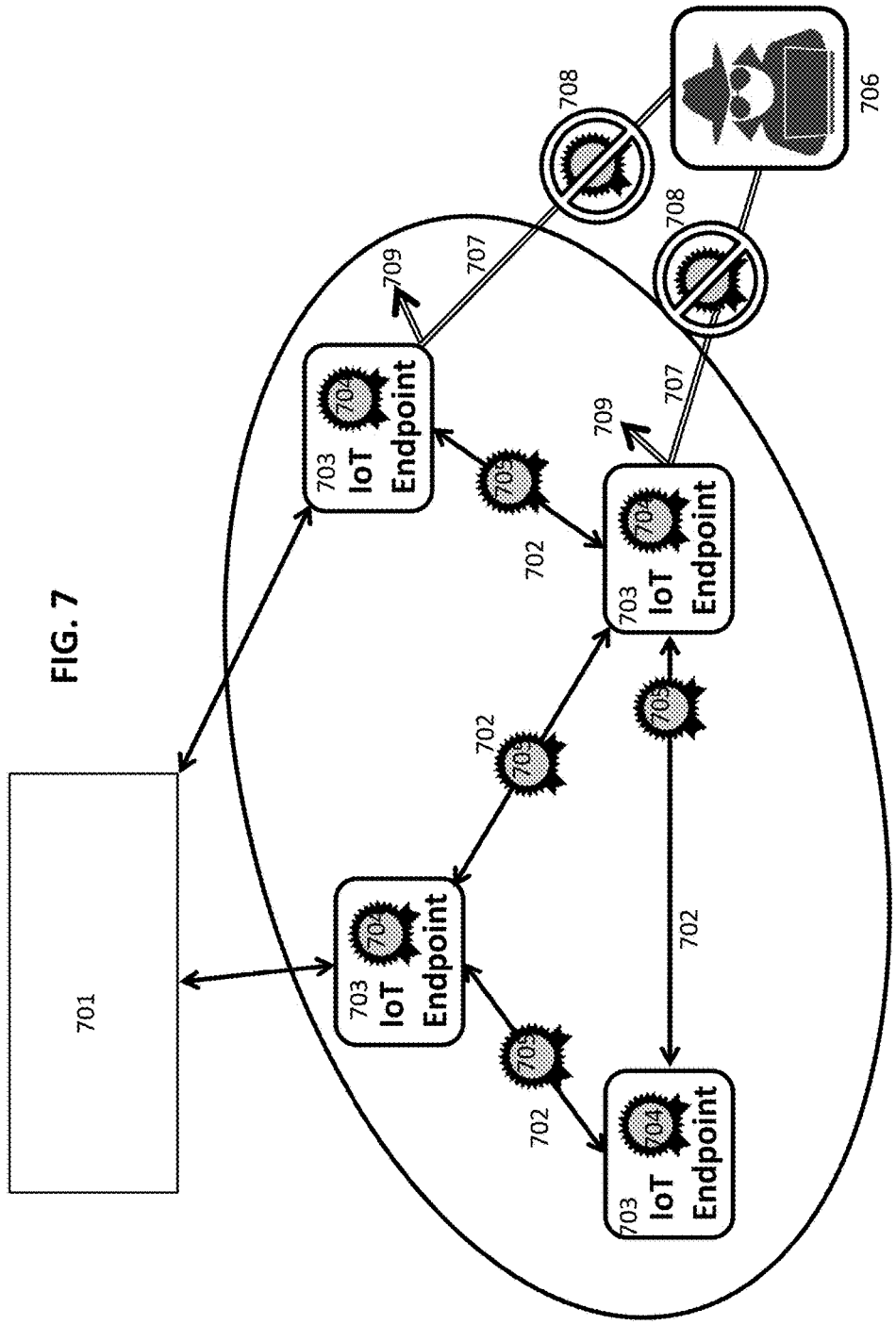
FIG. 7 illustrates some elements of a security ecosystem, according to some embodiments of the disclosed invention. no others.

FIG. 7 illustrates some elements of a security ecosystem 701, according to some embodiments of the disclosed invention. One of the unique elements of the security ecosystem 701 is that the primary enabling security is based upon communication lines 702 between endpoints 703, not just the endpoints themselves. However, the security ecosystem 701 of the disclosed invention not only issues certificates 704 to endpoints 703, but it also issues certificates to each authenticated communication line 705 that pairs of endpoints may establish (have established) and use. By building relationships only upon individual communication lines with certificates, the endpoint communication lines thus established effectively could be considered to have become white-listed. The white-listing of device communication lines would typically be considered to enhance security. Rather than be centrally managed, communication lines are typically established at the endpoint level between pairs of endpoints. This allows authenticated endpoints to establish secure communication lines with authenticated other devices with which they need to communicate with in order to meet operational needs. Communications from an unknown endpoint 706 without secure communication lines 707 that have previously been authenticated and have an issued certificate 708 are prevented or ignored 709 (invitations from unknown endpoints to establish a secure communication are not ignored, however such invitations are managed by an AA which supports the authentication of both devices). This is an anti-spoofing result properly provisioned endpoints with secure communication lines talk only to previously authenticated endpoints and no others.

Figure 8:
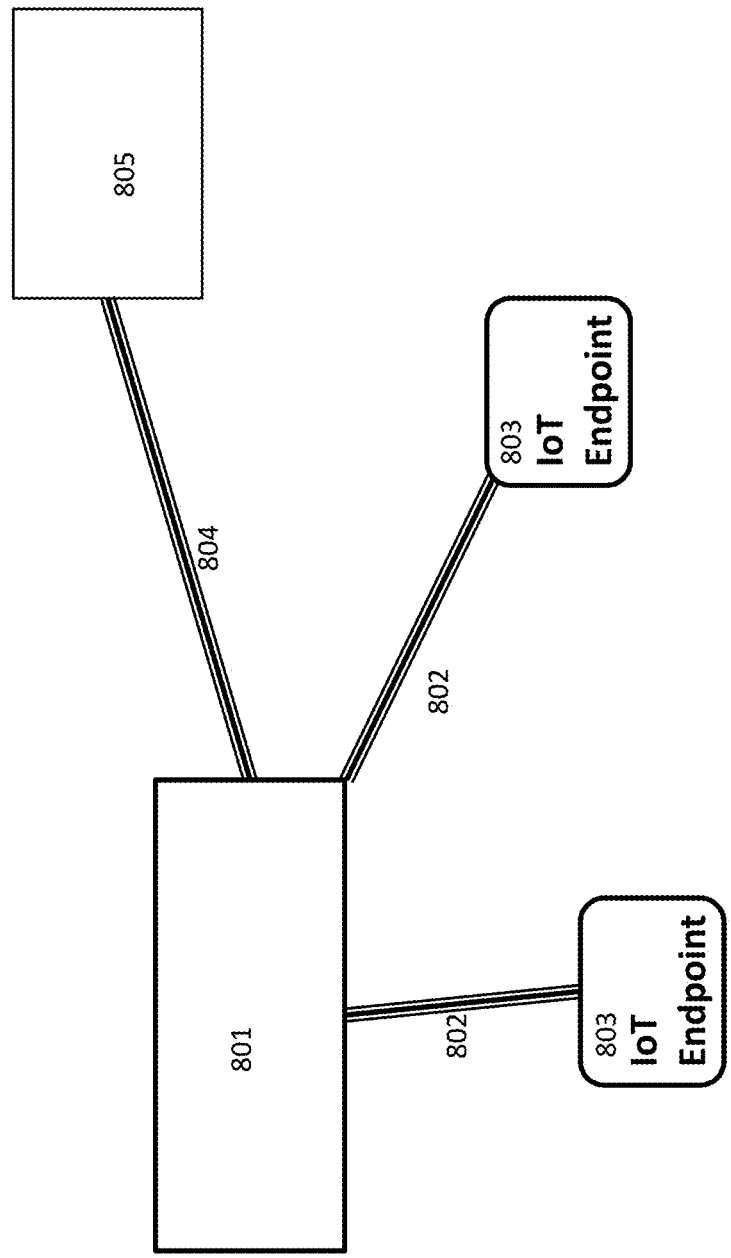
FIG. 8 shows an exemplary use of two application programming interfaces (APIs), according to some embodiments of the disclosed invention.

FIG. 8 shows an exemplary use of two application programming interfaces (APIs), according to some embodiments of the disclosed invention. In general terms an API is a set of clearly defined methods of communication between various software components. The security ecosystem may support two separate APIs. In some embodiments, an API 802 may be used by a client application on an IoT endpoint 803 to access, control, utilize, etc., the capabilities of the security ecosystem 801. In some embodiments, an IoT endpoint and the security ecosystem may communicate using other methods without an API. A second API 804 may be utilized by an external user, such as a user from an IT department, for multiple uses. One such use is to view the statuses of all or some of the devices (including IoT devices as well as non-IoT devices) secure communication lines, certificates, groups, relationships, etc. created, maintained and/or supported by the security ecosystem. Such an API may provide comprehensive, granular visibility to such information. Such information optionally could be used by an external system or user for a variety of analytics purposes. Optionally, the API may provide capabilities to direct all or a portion of the activities that the security ecosystem may conduct. In some embodiments, an external system operating under the direction of an artificial intelligence computer program can utilize this API.

In some embodiments, the disclosed invention may provide software/firmware updates uniquely for devices. For example, an image of the firmware (or a certificate associated with the firmware) is digitally signed by an established firmware signing authority recognized by a trusted public key being held, for example, by the LKSM of a secure component of the subject device to be updated. Using industry standard code signing technology, the firmware may be digitally signed using the private key of the code signing authority. The signed code is transmitted to the subject device. Upon receipt, the subject device first uses the trusted public key in its possession to verify that the code signing authority did, in fact, sign the code. Upon such verification, the subject device may complete a firmware update.

In some embodiments, a device digital record of the unique image of the device's firmware installation may be provided and the record may then be digitally signed by the device or an authority. If needed, at a later point in time, a new image can be created and compared to the previously created image to determine if the two images match. If they do not match, an attack or other problem with the device may be investigated or other action may be taken.

In some embodiments, audit trails are generated from actions such as inviter/invitee processing, provisioning, the establishment of groups together with other actions taken within the security ecosystem, based in part on digital signatures. Some embodiments provide an audit trail of the composite of the inviter and invitee processing.

Figure 9:
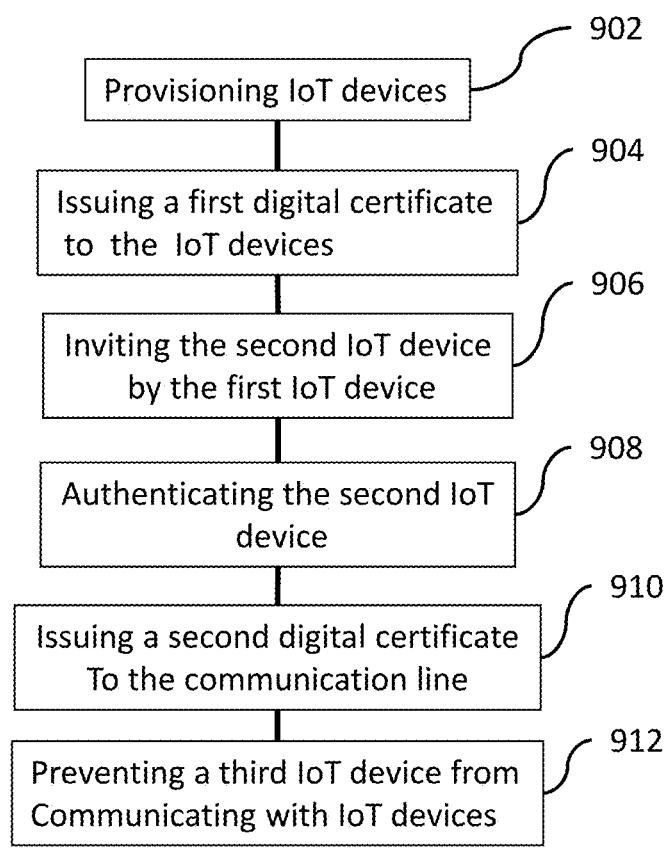
FIG. 9 is an exemplary process flow for establishing a secure communication between a plurality of IoT devices, according to some embodiments of the disclosed invention.

FIG. 9 is an exemplary process flow for establishing a secure communication between a plurality of IoT devices, according to some embodiments of the disclosed invention. As shown in optional block 902, a first and a second IoT devices may be provisioned by providing a unique identification, a digital identity token and a cryptographic key to and authenticating each of the first and second IoT devices. As described above, the provisioning may be performed at the time of manufacturing a product that includes some IoT devices, at the time of installing the IoT device within the product, at the time of programming the product or the IoT devices, or at any time before establishing the communication between the IoT devices at issue. In either case, the IoT devices at issue would have a unique identification and a cryptographic key and are authenticated before they establish a secure communication line.

A first digital certificate is issued to the devices, for example, by a trusted third party, such as an attribute authority (AA), in block 904. In block 906, a first IoT device invites a second IoT device to establish a (unsecure) communication line with the first IoT device by receiving a digital token from the second IoT device. In block 908, the second IoT device is authenticated to the first IoT device using the unique identification, the digital identity token and cryptographic key of the second IoT device, as described in detail throughout the present disclosure. In block 910, a secure communication line between the first IoT device and the second IoT device is established by authenticating the unsecured communication line using a second digital certificate provide to the communication line between the first IoT device and the second IoT device. This way, the security ecosystem of the disclosed invention not only issues (first) certificates to IoT devices (endpoints), but it also issues (second) certificates to each authenticated communication line that pairs of IoT devices (endpoints) have established and use.

In block 912, another (a third) IoT device for which a secure communication line to the first or second IoT device has not been established is prevented from communicating with the first or second IoT device.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for establishing a secure communication between a plurality of Internet of Things (IoT) devices, each IoT device including a hardware processor and associated memory, the method comprising:
provisioning a first and a second IoT devices by providing a unique identification, a digital identity token and a cryptographic key to each of the first and second IoT devices;
authenticating the second IoT device by the first IoT device;
inviting the second IoT device by the first IoT device to establish a communication line with the first IoT device;
establishing a secure communication line between the first IoT device and the second IoT device by authenticating the communication line between the first IoT device and the second IoT device and issuing a digital certificate to the communication line between the first IoT device and the second IoT device;
establishing secure communication lines between the first IoT device, the second IoT device and a plurality of more devices; and
grouping the first IoT device, the second IoT device and the plurality of more devices into different groups based on a predetermined criteria, wherein grouping the devices includes group membership and a plurality of associated rules in a respective certification for a respective secure communication line.

2. The method of claim 1, wherein the secure communication line includes a digital agreement establishing terms of use of the secure communication line between the first and second IoT devices.

3. The method of claim 1, further comprising preventing a third device for which a secure communication line to the first or second IoT device has not been established from communicating with the first or second IoT.

4. The method of claim 1, wherein the first and second IoT devices are components of one or more of an automobile, a medical device, a household appliance, and an aircraft.

5. The method of claim 1, wherein authenticating the second IoT device comprises using the unique identification and the digital identity token of the second IoT device.

6. The method of claim 1, wherein authenticating the second IoT device comprises using an inviter-invitee protocol.

7. A system for establishing a secure communication between a plurality of Internet of Things (IoT) devices, each IoT device including a hardware processor and associated memory, comprising:
a first IoT device including a first unique identification, a first digital identity token and a first cryptographic key; and
a second IoT device including a second unique identification, a second digital identity token and a second cryptographic key to establish a communication line with the first IoT device, wherein the first IoT and the second devices receive a digital certificate, establish a secure communication line therebetween by authenticating an established communication line between the first IoT device and the second IoT device, wherein the first IoT device further establishes secure communication lines with a plurality of more devices, wherein the first IoT device and the plurality of more devices are grouped into different groups based on a predetermined criteria, and wherein grouping the devices includes group membership and a plurality of associated rules in a respective certification for a respective secure communication line.

8. The system of claim 7, wherein the secure communication line between the first IoT device and the second IoT device includes a digital agreement establishing terms of use of the secure communication line between the first and second IoT devices.

9. The system of claim 7, wherein the first and second IoT devices are components of an automobile.

10. The system of claim 7, wherein the first and second IoT devices are components of a medical device.

11. The system of claim 7, wherein the first and second IoT devices are components of a household appliance.

12. The system of claim 7, wherein the first and second IoT devices are components of an aircraft.

13. The system of claim 7, wherein a third device for which a secure communication line to the first or second IoT device has not been established is prevented from communicating with the first or second IoT device.

14. A method for establishing a secure communication between a first Internet of Things (IoT) device and a second IoT device, each IoT device including a hardware processor and associated memory, a unique identification, a digital identity token and a cryptographic key, the method comprising:
    establishing an unsecure communication line between the first IoT device and the second IoT device;
    providing a first digital certificate to each of the first and second IoT devices;
    authenticating the second IoT device by the first IoT device;
    authenticating the unsecure communication line between the first IoT device and the second IoT device;
    providing a second digital certificate to the communication line between the first IoT device and the second IoT device to establish a secure communication line between the first IoT device and the second IoT device;
    establishing secure communication lines between the first IoT device and a plurality of more devices; and
    grouping the first IoT device, the second IoT device and the plurality of more devices into different groups based on a predetermined criteria, wherein grouping the devices includes group membership and a plurality of associated rules in a respective certification for a respective secure communication line.

15. The method of claim 14, wherein authenticating the second IoT device comprises using the unique identification and the digital identity token of the second IoT device.

16. The method of claim 14, further comprising preventing a third IoT device for which a secure communication line to the first or second IoT device has not been established from communicating with the first or second IoT device.

17. The method of claim 14, further comprising inviting the second IoT device by the first IoT device to establish said unsecure communication line, by receiving a digital token from the second IoT device.

18. The method of claim 14, wherein the secure communication line between the first IoT device and the second IoT device includes digital agreement establishing terms of use of the secure communication line between the first and second IoT devices.

19. The method of claim 14, wherein the first and second IoT devices are components of one or more of an automobile, a medical device, a household appliance, and an aircraft.

* * * * *

UNITED STATES PATENT AND TRADEMARK OFFICE
CERTIFICATE OF CORRECTION

PATENT NO. : 9,832,026 B2
APPLICATION NO. : 15/621982
DATED : November 28, 2017
INVENTOR(S) : David W. Kravitz et al.

Page 1 of 1

It is certified that error appears in the above-identified patent and that said Letters Patent is hereby corrected as shown below:

On the Title Page

(54) Title, and in the Specification, Column 1, Line 1, delete "FROM" and insert -- FOR --

Signed and Sealed this
Fourteenth Day of May, 2019

Andrei Iancu
*Director of the United States Patent and Trademark Office*